United States Patent [19]

Osborne et al.

[11] Patent Number: 5,164,912
[45] Date of Patent: Nov. 17, 1992

[54] EXPERT SYSTEM TESTER

[75] Inventors: Robert L. Osborne; Karl E. Harper, both of Winter Springs, Fla.

[73] Assignee: Westinghouse Electric Corp., Pittsburgh, Pa.

[21] Appl. No.: 758,365

[22] Filed: Sep. 10, 1991

Related U.S. Application Data

[63] Continuation of Ser. No. 437,951, Nov. 17, 1989, abandoned.

[51] Int. Cl.⁵ .............................................. G06F 15/18
[52] U.S. Cl. ................................ 364/580; 364/551.01; 395/50; 395/75
[58] Field of Search .................... 364/580, 550, 551.01; 395/50, 75

[56] References Cited

U.S. PATENT DOCUMENTS

| | | | |
|---|---|---|---|
| 4,648,044 | 3/1987 | Hardy et al. | 364/513 |
| 4,885,712 | 12/1989 | Yamane | 364/580 |
| 4,891,766 | 1/1990 | Derr et al. | 364/513 |
| 4,941,102 | 7/1990 | Darnell et al. | 364/513 |

*Primary Examiner*—Thomas G. Black

[57] ABSTRACT

The present invention is an expert system test system which has the capability of exercising all combinations of data input types using specialized data test sets. The specialized data test sets include a set of sensor values for each level of an operating system. All levels of diagnosis can be tested without testing every possible sensor value and combination of sensor values. The test sets can be combined to produce various orders of testing allowing complex relationships between sensors and rules to be tested. The system includes a test plan which is used by the testing system to iteratively apply the normal and specialized test data to the expert system. Changing the sensor values produces outputs for each iteration which are compared to expected results or to a baseline. Each test produces a log file which can be examined by the knowledge engineer. If exceptions are produced, the system produces an exception report which allows the knowledge engineer to determine whether the exception is abnormal or unexpected. An output log is also stored as historical data and used with future tests to obtain a complete test regression comparison using conventional database comparison tools. The system includes a test language which allows the user to formulate a test plan without the need for complicated programming associated therewith by designating the rulebase to be used, and by defining the order of the test and the tests performed therein, along with exceptions which include exceptions which include simple, set and sufficiency type exceptions.

15 Claims, 4 Drawing Sheets

EXPERT SYSTEM TESTER

This application is a continuation of application Ser. No. 07/437,951, filed Nov. 17, 1989, now abandoned.

BACKGROUND OF THE INVENTION

1. Field of the Invention

The present invention is directed to an expert system tester that allows extensive expert system rulebased testing without the test program having any knowledge of the particular rulebase being tested and, more particularly, provides a practical regression testing method for analyzing rulebase changes after a modification has been made which is cost effective and significantly raises rulebase quality.

2. Description of the Related Art

It is common for expert system rulebases to typically exceed a thousand rules and in such systems sensor inputs commonly number in the hundreds. If the sensors are digital sensors providing one of two input values, the number of possible combinations of input values is enormous and testing all combinations is practically impossible. When analog sensors are involved, which have an infinite number of possible input values, the testing problem becomes even greater. During normal development of new rules for a large rulebase, normal debug type of production rule testing by the knowledge engineer is performed. In such a situation when the knowledge engineer produces a new rule, the engineer exercises the system using simulated plant data having values over the expected range of sensor values for the sensors examined by the new rule to verify that the new rule is operating as expected, that is, producing the diagnosis expected when expected. In such a situation, sensor values other than the sensor values used by the new rule are kept at normal values. As a result, production type testing does not determine the effect of other sensors on the new rule or the interaction of the new rule with the remaining rules. A second type of testing is to place the expert system online with real, continuous plant data and have the knowledge engineer carefully examine the diagnoses made to determine whether the diagnoses were intended. It has become apparent that more effective techniques and tools are needed for operational verification of large rulebase and input number systems.

SUMMARY OF THE INVENTION

It is an object of this invention to provide diagnostic rulebase verification without having to utilize any knowledge inside the tested rulebase to initialize and exercise the test tool.

It is another object of the present invention to provide a realistic regression test system for an expert system that has the capability of exercising all combinations of input data types.

It is a further object of the present invention to provide an expert system tester which depends on specialized test cases to exercise sophisticated diagnoses.

It is also an object of the present invention to provide a test system which will determine the effect of all sensors on a new rule and the interaction of all rules with the new rule.

The above objects can be accomplished by an expert system test system which has the capability of exercising all combinations of data input from specialized data test sets. The system includes a test plan which is used by the testing system to guide the iterative application of the specialized test data to the expert system to produce outputs for each iteration which are compared to expected results or to a baseline output produced with a normal data test set. If the expectations are not met, the system produces an exception report which allows the knowledge engineer to determine whether the exception is abnormal. An output log of the test is produced which allows regression between rulebase changes to be determined. The system includes a test language which allows the user to formulate a test plane without the need for complicated programming associated therewith.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Regression testing is a method for analyzing rulebase changes after a modification has been made. Two kinds of changes are possible: (1) changes that were intended, and (2) inadvertent changes that regress other unrelated aspects of the rulebase. Regression testing is important because changes and error corrections may introduce more errors than were created in the original coding of the schemata of the rulebase.

A complete regression test exhaustively exercises the rulebase through all the possible combinations of data input and diagnosis scenarios. From a practical viewpoint, this is not possible because of the time needed to perform a complete test. A more realistic regression test exercises all combinations of data input types and depends on specialized test cases representing each type (a subset of an exhaustive test) to exercise sophisticated diagnoses.

The testing system or regression analyzer of the present invention addresses these practical test requirements. The present invention accepts as input a production quality rulebase, a sensor data set, and a test plan. For each data combination a normal diagnosis is run using "normal" data which will not cause any diagnosis to indicate an abnormality such as an alarm. The normal diagnosis is followed by an iteration with perturbed data. The normal and perturbed test cycle can continue until all combinations have been tested. The system produces a test log file and a separate exception list of possible inadequacies, as defined by the test plan. The analyzer can be run interactively to perform simple tests, or in batch mode overnight to run extensive tests. The log and exceptions can be compared between rule changes to determine if regression has occurred.

Figure 1:
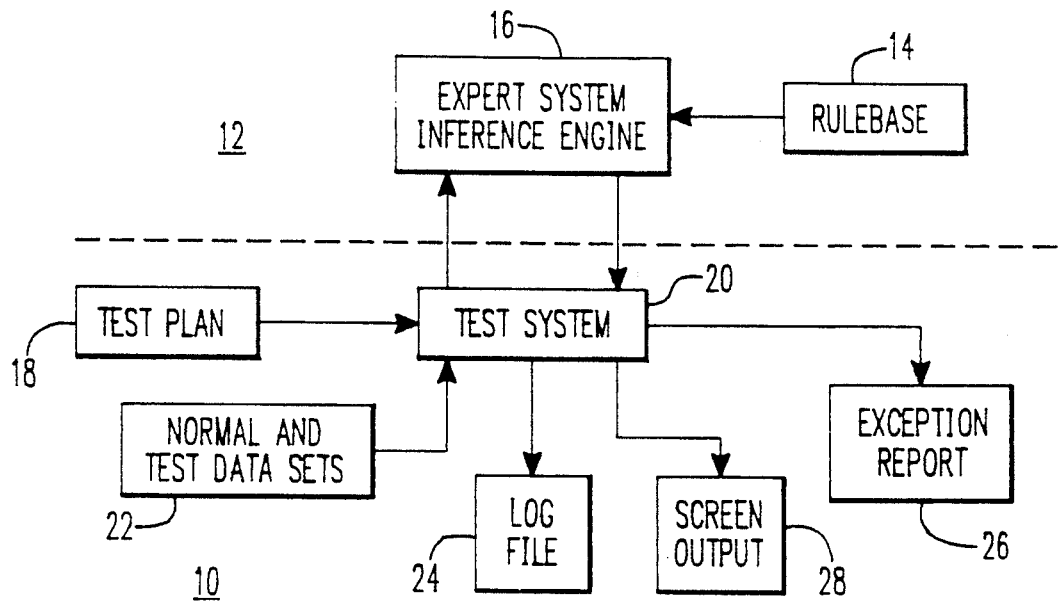
FIG. 1 illustrates the components, inputs and outputs of the present invention.

The regression tester 10 of the present invention, as illustrated in FIG. 1, interacts with an expert system 12 which includes a production rulebase 14 and an expert system inference engine 16. It is preferred that the expert system inference engine be the Processor Diagnostic System (PDS) available from Westinghhouse and described in U.S. Pat. Nos. 4,644,479 and 4,649,515. A description of the operation of the preferred expert system can be found in Kemper and Harper, The PDS Manual, PDS version 5.1, Diagnostics, Westinghouse Electric Corporation (1987) incorporated by reference herein. The regression analyzer includes a test plan 18, which is created using a test plan language, to be described in more detail later, and which is used by the test system 20 to access normal and test data sets 22 that are applied to the inference engine 16. The inference engine performs an analysis (diagnoses) using the production rules in the rulebase 14 producing outputs which are stored in a log file 24 by the test system and compared to expected results to produce an exception report 26. The system also allows the output to be displayed on the CRT screen 28. It is preferred that the present invention be implemented on a Digital Equipment VAX 8000 Series computer running a VMS operating system. It is also preferred that the present invention be implemented in a language such as "C" suitable for a structured design approach as discussed later herein.

Figure 2:
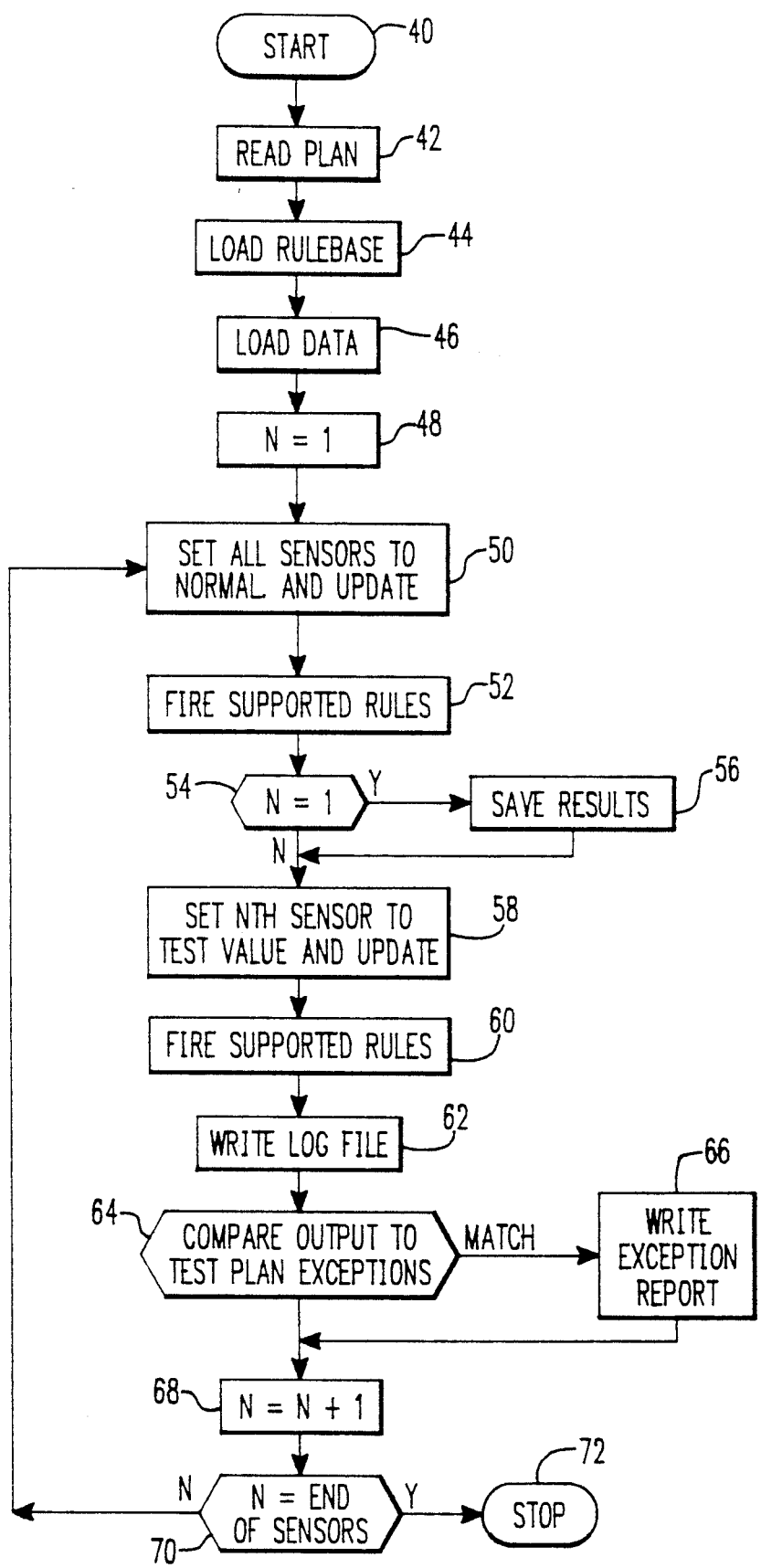
FIG. 2 is a flowchart of the operation of a first order test in accordance with the present invention.

As will be discussed in more detail later, the present invention is capable of performing first through sixth order specialized expert system tests. One of skill will of course recognize that as processors get faster even higher order tests will become practical. FIG. 2 illustrates the general operation of the present invention during a first order test. The present invention starts 40 by reading 42 the test plan 18. The test plan 18 is created using a specialized test plan language which will be discussed in more detail later. The test plan language produces a regression test plan 18 which is stored in a text file and read 42 into the test system 20. Next the production rulebase 14 is loaded 44 followed by loading 46 of the test data. Next a pointer to the sensor whose value is to be changed is set 48 and then all sensors are set to a normal value and all are updated 50. The setting of all sensor values to a normal value applies a complete normal data test set to the expert system. The update operation causes the inference engine 16 of the expert system to recognize that a new sensor value is available. In this way in step 50 all the rules are flagged for firing or testing.

Next, the rules in the expert system which have new (updated) sensor values are fired and continue firing until no further changes (firings) occur. If this is the first cycle 54 of the test, the results of the normal sensor data expert system diagnoses are saved 56 as a baseline. Next one of the sensors is set to a test value and updated 58, followed by firing 60 of the supported rules, that is, the rules which use the new sensor value. The output of the expert system (updated malfunctions, preferably with a positive confidence) is then written to a log file 24. A complete output data set is produced because all input values are applied to the expert system. The output is next compared 64 to the test plan exceptions and if there is a match, an exception report is written 66. The pointer is then updated 68 and tested 70 to determine if the end of the sensors has been reached. If not, the cycle is repeated, otherwise, the system stops. As can be seen from FIG. 2, the system cyclically applies the normal test data and the specialized test data and iteratively (one sensor value change at a time) applies the specialized test data between cycles. That is, a test value is provided for all the sensors, thereby providing a complete specialized test set.

Figure 3:
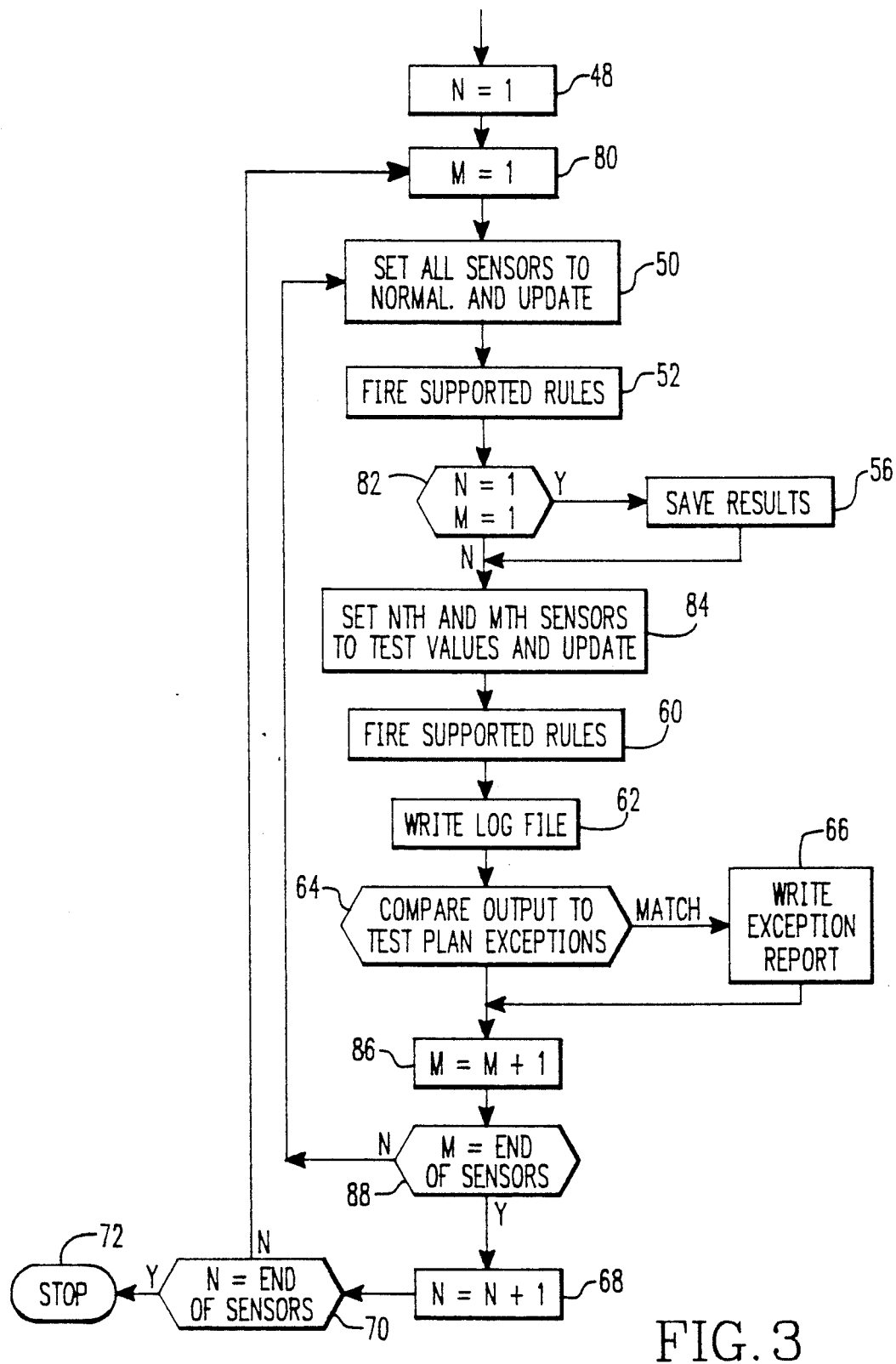
FIG. 3 illustrates how a first order test can be modified to produce a second order test.

FIG. 3 illustrates the general operation of the present invention when a second order test is being performed. This requires the addition of a new pointer 80 so that two sensor values can be changed from a normal value to a perturbed value. To determine whether this is the first cycle of the test, both pointers must be tested 82 before the results are saved 56. Because two sensor values are now being changed both sensor values must be updated 84 before the rules are fired 60. Because an additional pointer is included, the system must update 86 this pointer and test it to determine whether it has reached the end of the sensors. As can be seen by comparing FIGS. 2 and 3 to provide additional test order capability, the present invention merely needs to provide additional sensor pointers, appropriate sensors update steps and pointer increment and test loops. Appendix IV illustrates how such can be provided for a sixth order test capability in a structured design approach.

The sensor data or data sets 22 input to the regression analyzer or system 20 of the present invention are preferably in standard PDS form. Seven data sets, or in PDS terminology, timesets, are required for sixth order test capability. These timesets can be created using PDS. The sensor values can be logical or numerical as needed.

The first timeset should be a normal set of readings. This set should produce confidence factors in the PDS system between zero and minus one. This data is used as a benchmark or baseline to compare with all other conditions.

The next six timesets represent the data produced from abnormal equipment operation. Generally the abnormal timesets or data sets should be values taken on both sides of and at the boundaries for different condition levels of the expert system. That is, the test set should provide a test value for each diagnostic level of the system to be tested, for example, in a power plant the levels are predicted, diagnostic, warning, shutdown and sensor failure. For a power plant these values can be obtained from the alarm levels of the plant. The examples used int his description will be for a power plant even though other types of data sets, such as economic data could be used.

The second timeset has readings that are expected when each sensor is under range or failed with a low value. These readings should generate at least one sensor diagnosis for each failed sensor and the confidence factor for the sensor rules in the PDS system should be positive while all others are negative. The third timeset has readings that are expected when each sensor is over range or failed with a high value. These readings should generate at least one sensor diagnosis for each failed sensor with one confidence factor condition in the PDS system positive and all others negative. The fourth timeset is used to define readings that have a predictive value in the rulebase design. That is, the predictive level sensor values fire rules which predict likely consequences of continued operation under such conditions. This category is intended to provide test data at a level before diagnostic alarms are activated. The fifth timeset has readings that trigger diagnostic PDS alarms. These readings should generate low level, positive confidence in at least one malfunction diagnosis. The sixth timeset has readings that trigger protection I PDS alarms. These readings should generate moderate level, positive confidence in at least one malfunction diagnosis. The seventh timeset has readings that trigger protection II PDS alarms. These readings should generate high level, positive confidence in at least one malfunction diagnosis.

The regression test plan 18 in the present invention is defined in a text file and read into the test system 20. The plan is composed of tests that exercise the rulebase with one, two, three, or up to six combinations of sensor values changed with each cycle. As previously illustrated, for example, a first order test cycle runs a normal reading through the rulebase, followed by using the same set of normal readings with one sensor value changed to a trip reading. The entire first order test repeats the normal/perturbed execution for every sensor. The plan definition can also include exception report specifications for each test. An exception is a request to record any instance of a condition. For example, a useful exception to include in the above first order test is to report if there are no malfunctions with confidence greater than 0.5 resulting from one of the test cycles. Exceptions should be designed in a way to signal regression test failure by the existence of exception reports.

The first line of the test plan file preferably contains the directory specification for where the rulebase files reside. Each of the following lines preferably has either a test definition or exception definition. Exceptions following a test definition apply only to that test.

A single regression test is preferably specified by a set of sensor categories surrounded by parentheses. For example, a first order test of the trip data, followed by a second order test of the warning and trip data is given by:

(Trip)
(Warn Trip)

A plan with this test sequence designates a first order test which will cause the rulebase to be executed for every sensor trip value, and the log file will record all the updated malfunctions and procedure results. This is followed a second order test performed by executing the rulebase for every trip value, while each sensor is set in turn to the warning value. Because there are no exceptions defined, no entries are made in the exception report 26.

Exceptions are divided into three categories providing three basic filters: 1. Update exceptions; 2. Level exceptions; and 3. Change exceptions. Update exceptions test to see if appropriate malfunctions and procedures are updated by a diagnosis cycle. For example, the exception to report any updated malfunction is:

Exception: Malf update.

Level exceptions compare the resulting malfunction or procedure parameter with a fixed value. For example, the exception to report when a malfunction confidence is greater than 0.5 is:

Exception: Malf CF>0.5.

Change exceptions compare the diagnosis percent change with a constant. The percent change is computed using a conventional formula: (newvalue-oldvalue)/oldvalue. Oldvalue is the malfunction or procedure parameter of the normal diagnosis saved in step 56 of FIG. 2. Newvalue is the same parameter that results from the second diagnosis (58 and 60) of the cycle. The effect is that a positive change is away from zero and a negative change is toward zero. For example, the exception to report at least a positive ten percent change in a procedure confidence is:

Exception: % Proc>10.0

There are three classes of exceptions providing three variations on the three basic filters: 1. Simple exceptions; 2. Set exceptions; and 3. Sufficiency exceptions. Simple exceptions are like the category examples shown above, where the exception is composed of a parameter, an operator, and constant. Each time a simple exception tests true, the test definition, perturbed sensors, malfunction or procedure that triggered the exception and parameter values are logged 66 in the report. Set exceptions are simple exceptions preceded with the qualifier ALL, SOME, or NO. In this case a report is generated if the set composed of the exception parameter matches the exception definition. If the exception tests true for the entire test, the test definition and perturbed sensors are reported 66 in the exception report. With the SOME set qualifier the number of elements in the set is also entered 66 in the exception report. For example, the exception to report when some of the malfunction confidences in a regression test are greater than zero is:

Exception: Some Malf CF>0.0

Sufficiency exceptions are simple exceptions preceded with the qualifier LTN (less than) or GTN (greater than). In this case a report is generated if the number of exception matches is less than (greater than) the order of the regression test. If the exception tests true for the entire test, the test definition, preturned sensors, and number of matches is reported 66. For example, the exception to report when less than one malfunction severity in a trip regression test is greater than 3.0 is:

(Trip)
Exception: LTN Malf Severity>3.0

Each exception is of the form:

Exception: <qualifier> <parameter> <operator> <constant>

The parameter specifies what result of the diagnosis is to be examined. A parameter is defined by:

<object> <attribute>

Valid objects are malfunctions or procedures. Omitting the object portion of the parameter indicates that both malfunction and procedures should be checked. Attributes, used by all categories except update exceptions, when the preferred expert system is used, are confidence (CF), severity (SEV), importance (IMP), or priority (PR).

Operators used in exceptions are:

Updated, !Updated, = =, ! =, >, > =, <, < =

The first two operators are used only with update exceptions and indicate if any rule supported by the updated value fired. The rest define a comparison between the parameter and a floating point constant with the third and fourth operators compare for equality and inequality.

The requirements of the test plan can be implemented in a test plan language as defined in Appendix I. This language definition can be used by a person of ordinary skill in the art to create a parser generated by the YACC and LEX unix third generation language development tools available which will accept the test plan text file and output an appropriate internal representation of the plan. An example of a test plan is illustrated below:

Rulebase directory:
ps:[harper.pds.code.regress.vbl]
TEST 1. (Normal)
Exception 1: ! Updated TEST 2. (Trip)
Exception 1: CF>0.800000
Exception 2: LTN CF>0.800000

Two results files are preferably produced by the regression analyzer of the present invention. If the analyzer is run in batch mode there also is an output file from the session. The output file shows the progress of the tests. The log file 24 is usually quite lengthy because it lists all the sensors, their descriptions, and the test data, all the malfunctions and procedures and their descriptions, the test plan, and the individual test result listings. The exception results or report file 20 is more manageable and lists all the exception reports from the tests.

The screen output 28 from the present invention preferably shows informational and error messages generated during the rerunning of PDS. Each test is identified and timestamped along with the diagnostic cycles that are run. This output is similar to the file produced by the diagnostic version of PDS. An example of screen output can be found in Appendix II.

The log file 24 is a record of the entire test. This record can be achieved in a conventional source code library and used to later compare the complete test results with complete test results of a run with new rulebase changes to perform a regression comparison. A conventional difference comparison between complete log files will show exactly what changed between the time the tests were run. In this way, a regression analysis between rulebase changes can be performed. In addition, the log defines explicitly what the inputs and outputs to the rulebase are, which can later be used as training examples for other types of expert systems, for example, a neural net expert system implementation. There are preferably three sections in the log file as illustrated in Appendix II. The first section details the test parameters: the sensors and sensor data, malfunctions and procedures, and all their descriptions. The second section is a listing of the test plan. The third section contains the test cases. For each case the malfunctions and procedures that were updated are listed in alphabetical order, along with their confidence, severity, importance, and priority.

The exceptions file 26 is a report of each instance that matches with the exceptions defined in the test plan. The exceptions file is essentially a filtered log file where the filter characteristics are defined by the exceptions specified by the user. As illustrated in Appendix II, each report is of the form:

(<timeset>/<sensors> . . .)<object> <message>

As previously mentioned, timesets are sensor data categories, for example trip or warning. Sensors are the names of the sensors that were assigned values other than normal for this diagnostic cycle. Objects are either malfunction or procedure names. Messages are text that identify the type of exception report.

The present invention is preferably implemented using a structured design approach as discussed is:
Structured Design: Fundamentals of a Discipline of Computer Program Design, Yourdon and Constantine, Yourdan Press, 1979; Structural Analysis And System Specification, DeMarco, Yourdon Press, 1979; Software Engineering: A Practitioner's Approach, Pressman, McGraw Hill Book Company, 1982; and Tutorial on Software Design Techniques, Freemen and Wasserman, 4th Ed, IEEE Computer Society Press, 1983.

Figure 4:
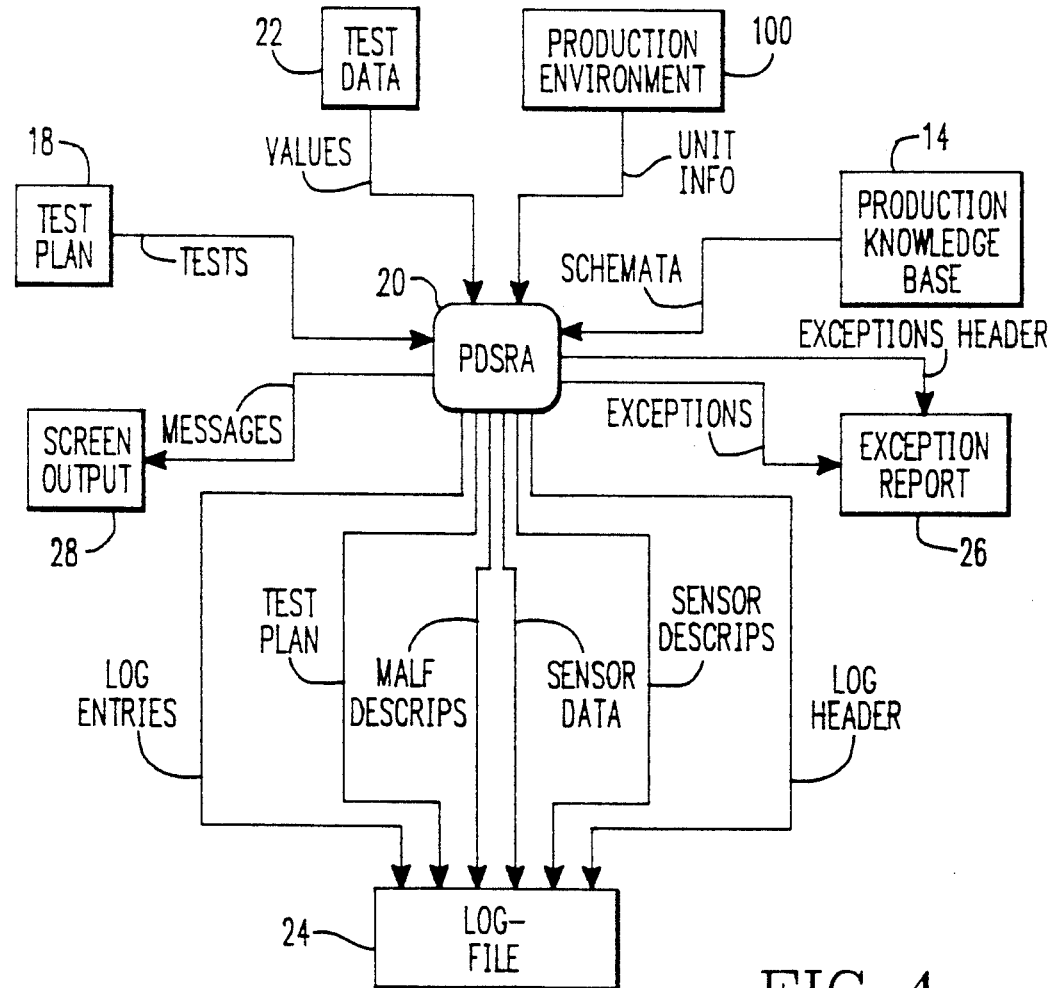
FIG. 4 illustrates data flow when the present invention is used with a preferred expert system.
Figure 5:
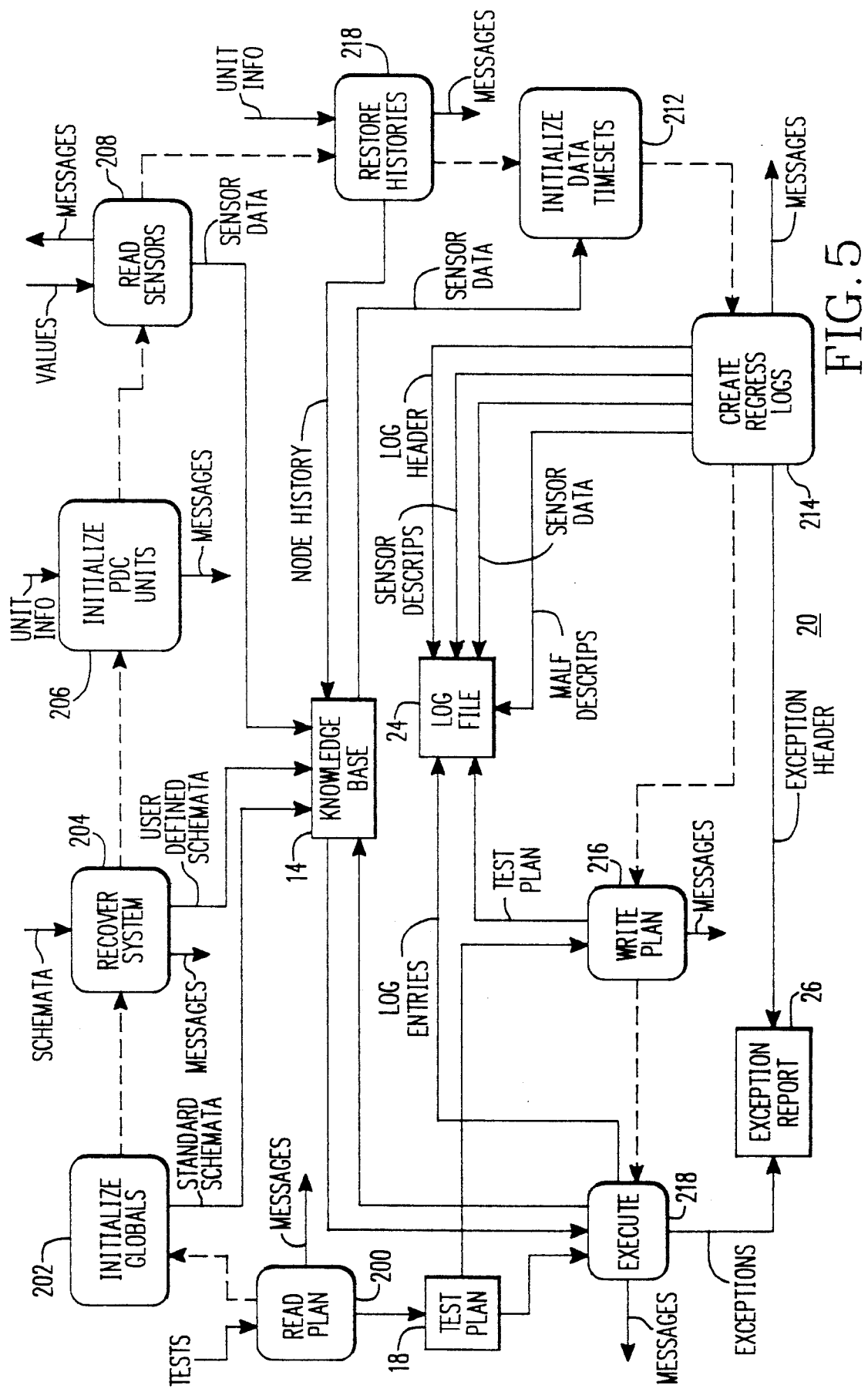
FIG. 5 illustrates the execution sequence of the preferred expert system and the present invention.

More particularly the present invention is preferably implemented using a systems development tool such as CASE Analyst/RT Users Manual for VAX station/VMS Hosts VO.O 4.1, Mentor Graphics, 1988 which implements a methodology described in Structured Analysis And System Specification, De Marco, Yourdon Press, 1979. This approach or tool allows the designer to create and maintain control and data flow diagrams which can be implemented by standard "C" routines and custom "C" routines quickly and efficiently. FIGS. 4 and 5 illustrate the present invention using data flow and control flow diagrams in this methodology using the abovementioned tool. The data defintions used when the present invention is implemented using this methodology is attached as appendix III. One of ordinary skill in the art would be able to create the present invention from the diagrams, the information previously described and the appendices. FIG. 4 illustrates the data flow into and out of the test system 20 in addition to the information previously mentioned with respect to FIG. 1. FIG. 4 illustrates that the production environment 100, that is plant information must be included in the system.

As illustrated in FIGS. 4 and 5, the first step in the present invention, is to read 200 the test input in the test plan language by the user, parse the test plan input and create the internal test plan representation 18. The next step is to initialize 202 all global variables. This step is part of the PDS expert system inference engine 16 and it creates and initializes the true, false and other contents, and creates and initializes the PDS variables that manage sensor time steps. The system is next recovered 204 which is also part of the PDS inference engine 16. This routine accepts the text file knowledge base definition and loads the corresponding schemata into memory 14. The next step is also part of the PDS inference engine 16 and it reads 206 the unit information text file. This file is part of the PDS production environment 100 that associates a knowledge base with a specific customer application and, as a side effect, the present invention uses the unit name in all output file headers. Next the system reads 208 the sensors values, a step which is also a part of the PDS inference engine 16. This step reads the sensor data text file in standard format and loads the sensor values and time stamps into an internal reading list. The PDS inference engine 16 then restores 210 the histories. To perform this step the inference engine reads a history text file and loads text history lists and event records into the corresponding schemata. The history text file is part of the PDS production environment 100 that preserves time-based analysis results across inference engine restarts. Then a step is performed by the test system 20 ti initiate 212 the data timesets. This step merely uses the reading list created in the read sensor step 208 to fill a seven column timesets array with each sensors normal, fail low, fail high, predict, diagnostic, warning and trip values. The use of an array rather than a text list enhances the speed of the test system. The next step, which is also part of the present invention, is to create 214 regress logs. This step summarizes and records the complete specification of the analysis by writing to the log file: the time and customer application for this test plan, a description of all sensors and each of their seven data values, and a description of all the possible malfunctions. The step 214 opens and initializes the exception report and log files by writing the time and customer application of this text plan to the file 26. The next step 216 is also part of the test system 20, it writes the test plan read in by the read plan step 200 to the log file. It appends a copy of the test plan to the log file. The last step 218 is the execute step which calls the PDS inference engine 16 repeatedly to execute the diagnoses specified by the test plan. The detailed algorithm for this step is set forth in appendix IV.

As discussed above the present invention will provide an efficient, standard test tool which will verify diagnostic rulebases both during development and after modifications and upgrades are made during commercial use. The present invention allows programmable exceptions, provides a language to describe them along with a log file which can be used for training and testing all types of expert systems including neural networks and provides a programmable test agenda with its own language.

The many features and advantages of the invention are apparent from the detailed specification and thus it is intended by the appended claims to cover all such features of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, some expert systems have the capability of unfiring rules and PDS is one such system. Rather than fire all rules with normal values at steps 50 and 52 to effectively reset the system to the baseline, it is possible to unfire all the fired rules.

Appendix I

```
<regression test> --> (first line of plan) <directory>
                     (rest of plan)        <tests>

<directory> --> dev:[directory.subdirectory...] or
                logical name

<tests> --> <test> <exceptions>
<test> --> (<timeset> ...)
<timeset> --> Normal || Fail_LO || Fail_HI || Predict ||
              Diagnostic || Warning || Trip <exceptions> --> <exception> ...
<exception> --> Exception: (<simple exception> || <set exception> ||
                <sufficiency exception>)

<simple exception> --> <update exception> || <level exception> ||
                       <change exception>
<update exception> --> [<parameter object>] (Updated || !Updated)
<level exception> --> <parameter> <operator> <constant>
<change exception> --> X <parameter> <operator> <constant>

<set exception> --> <set qualifier> <simple exception>
<set qualifier> --> ALL || SOME || NO <sufficiency exception> --> <sufficiency qualifier> <simple exception>
<sufficiency qualifier> --> LTN || GTN <parameter> --> <parameter object> <attribute>
<parameter object> --> <empty> || MALFUNCTION || PROCEDURE
<attribute> --> CF || Severity || Importance || Priority
<operator> --> Updated || !Updated ||
               == || != || < || <= || > || >=
```

Appendix II

EXAMPLE REGRESSION TEST

SCREEN OUTPUT

PDS Regression Analyzer V1.0
(C) Westinghouse Electric Corporation 1988

```
7-NOV-1988 21:48:05.24 reading test plan
loading non-rules from ps:[harper.pds.code.regress.vb1]rulebase.crb
226 non-rules defined.
loading rules from ps:[harper.pds.code.regress.vb1]rulebase.crb
204 rules defined.
Done.
 7-NOV-1988 21:48:12.31 initializing rulebase
 7-NOV-1988 21:48:12.32 rulebase loaded for VB1
 7-NOV-1988 21:48:12.40 defining unit VB1
 7-NOV-1988 21:48:12.43 reading sensor data
 7-NOV-1988 21:48:12.79 creating log files
Test 1: ( Normal )
 7-NOV-1988 21:48:53.28 begin cycle...
 7-NOV-1988 21:48:53.29 context normal's value changed from 0 to 1
 7-NOV-1988 21:48:53.37 saving normal diagnosis results |
Test 2: ( Trip )
 7-NOV-1988 21:49:04.11 begin cycle...
 7-NOV-1988 21:49:04.14 context normal's value changed from 0 to 1 | MGBA
 7-NOV-1988 21:49:05.29 begin cycle...
 7-NOV-1988 21:49:05.32 context normal's value changed from 0 to 1 | MVXD
 7-NOV-1988 21:49:06.50 begin cycle...
 7-NOV-1988 21:49:06.53 context normal's value changed from 0 to 1 | VIBE1
 7-NOV-1988 21:49:13.75 begin cycle...
 7-NOV-1988 21:49:13.78 context normal's value changed from 0 to 1 | VIBE2
 7-NOV-1988 21:49:19.58 begin cycle...
 7-NOV-1988 21:49:19.60 context normal's value changed from 0 to 1 | VIBE3
 7-NOV-1988 21:49:26.26 begin cycle...
 7-NOV-1988 21:49:26.29 context normal's value changed from 0 to 1 | VIBE4
 7-NOV-1988 21:49:31.59 begin cycle...
 7-NOV-1988 21:49:31.63 context normal's value changed from 0 to 1 | VIBE5
 7-NOV-1988 21:49:36.00 begin cycle...
 7-NOV-1988 21:49:36.02 context normal's value changed from 0 to 1 | VIBE6
 7-NOV-1988 21:49:41.01 begin cycle...
 7-NOV-1988 21:49:41.09 context normal's value changed from 0 to 1 | VIBT10
 7-NOV-1988 21:49:45.74 begin cycle...
 7-NOV-1988 21:49:45.76 context normal's value changed from 0 to 1 | VIBT11
 7-NOV-1988 21:49:51.40 begin cycle...
 7-NOV-1988 21:49:51.45 context normal's value changed from 0 to 1 | VIBT12
 7-NOV-1988 21:49:56.52 begin cycle...
 7-NOV-1988 21:49:56.55 context normal's value changed from 0 to 1 | VIBT7
 7-NOV-1988 21:50:07.93 begin cycle...
 7-NOV-1988 21:50:07.96 context normal's value changed from 0 to 1 | VIBT8
 7-NOV-1988 21:50:14.76 begin cycle...
 7-NOV-1988 21:50:14.79 context normal's value changed from 0 to 1 | VIBT9

EXCEPTION RESULTS

PDS Regression Analysis V1.0    VB1            7-NOV-1988 21:48

( Normal ) m927 malfunction not updated
( Normal ) m928 malfunction not updated
( Normal ) m929 malfunction not updated
( Normal ) m930 malfunction not updated
( Trip/MGBA ) m943 malfunction CF 1.000000 > 0.800000
( Trip/MVXD ) m943 malfunction CF 1.000000 > 0.800000
( Trip/VIBE1 ) m906 malfunction CF 0.900000 > 0.800000
( Trip/VIBE1 ) m931 malfunction CF 1.000000 > 0.800000
```

```
( Trip/VIBE1 ) m938 malfunction CF 1.000000 > 0.800000
( Trip/VIBE1 ) m943 malfunction CF 1.000000 > 0.800000
( Trip/VIBE2 ) m900 malfunction CF 0.900000 > 0.800000
( Trip/VIBE2 ) m931 malfunction CF 1.000000 > 0.800000
( Trip/VIBE2 ) m935 malfunction CF 1.000000 > 0.800000
( Trip/VIBE2 ) m943 malfunction CF 1.000000 > 0.800000
( Trip/VIBE3 ) m908 malfunction CF 0.900000 > 0.800000
( Trip/VIBE3 ) m931 malfunction CF 1.000000 > 0.800000
( Trip/VIBE3 ) m941 malfunction CF 1.000000 > 0.800000
( Trip/VIBE3 ) m943 malfunction CF 1.000000 > 0.800000
( Trip/VIBE4 ) m904 malfunction CF 0.900000 > 0.800000
( Trip/VIBE4 ) m931 malfunction CF 1.000000 > 0.800000
( Trip/VIBE4 ) m938 malfunction CF 1.000000 > 0.800000
( Trip/VIBE4 ) m943 malfunction CF 1.000000 > 0.800000
( Trip/VIBE5 ) m902 malfunction CF 0.900000 > 0.800000
( Trip/VIBE5 ) m931 malfunction CF 1.000000 > 0.800000
( Trip/VIBE5 ) m935 malfunction CF 1.000000 > 0.800000
( Trip/VIBE5 ) m943 malfunction CF 1.000000 > 0.800000
( Trip/VIBE6 ) m910 malfunction CF 0.900000 > 0.800000
( Trip/VIBE6 ) m931 malfunction CF 1.000000 > 0.800000
( Trip/VIBE6 ) m941 malfunction CF 1.000000 > 0.800000
( Trip/VIBE6 ) m943 malfunction CF 1.000000 > 0.800000
( Trip/VIBT10 ) m901 malfunction CF 0.900000 > 0.800000
( Trip/VIBT10 ) m931 malfunction CF 1.000000 > 0.800000
( Trip/VIBT10 ) m935 malfunction CF 1.000000 > 0.800000
( Trip/VIBT10 ) m943 malfunction CF 1.000000 > 0.800000
( Trip/VIBT11 ) m907 malfunction CF 0.900000 > 0.800000
( Trip/VIBT11 ) m931 malfunction CF 1.000000 > 0.800000
( Trip/VIBT11 ) m938 malfunction CF 1.000000 > 0.800000
( Trip/VIBT11 ) m943 malfunction CF 1.000000 > 0.800000
( Trip/VIBT12 ) m911 malfunction CF 0.900000 > 0.800000
( Trip/VIBT12 ) m931 malfunction CF 1.000000 > 0.800000
( Trip/VIBT12 ) m941 malfunction CF 1.000000 > 0.800000
( Trip/VIBT12 ) m943 malfunction CF 1.000000 > 0.800000
( Trip/VIBT7 ) m903 malfunction CF 0.900000 > 0.800000
( Trip/VIBT7 ) m931 malfunction CF 1.000000 > 0.800000
( Trip/VIBT7 ) m935 malfunction CF 1.000000 > 0.800000
( Trip/VIBT7 ) m943 malfunction CF 1.000000 > 0.800000
( Trip/VIBT8 ) m905 malfunction CF 0.900000 > 0.800000
( Trip/VIBT8 ) m931 malfunction CF 1.000000 > 0.800000
( Trip/VIBT8 ) m938 malfunction CF 1.000000 > 0.800000
( Trip/VIBT8 ) m943 malfunction CF 1.000000 > 0.800000
( Trip/VIBT9 ) m909 malfunction CF 0.900000 > 0.800000
( Trip/VIBT9 ) m931 malfunction CF 1.000000 > 0.800000
( Trip/VIBT9 ) m941 malfunction CF 1.000000 > 0.800000
( Trip/VIBT9 ) m943 malfunction CF 1.000000 > 0.800000
```

5. LOG FILE

PDS Regression Analysis V1.0     VB1            7-NOV-1988 21:48

SECTION I. Test Parameters

Sensors

```
MGBA        - Breaker closed.
MWXD        - Load sensor
VIBE1       - Exciter end fiber optic end turn vibration sensor #1.
VIBE2       - Exciter end fiber optic end turn vibration sensor #2.
```

| Name | | |
|---|---|---|
| VIBE3 | - Exciter end fiber optic end turn vibration sensor #3. | |
| VIBE4 | - Exciter end fiber optic end turn vibration sensor #4. | |
| VIBE5 | - Exciter end fiber optic end turn vibration sensor #5. | |
| VIBE6 | - Exciter end fiber optic end turn vibration sensor #6. | |
| VIBT10 | - Turbine end fiber optic end turn vibration sensor #10. | |
| VIBT11 | - Turbine end fiber optic end turn vibration sensor #11. | |
| VIBT12 | - Turbine end fiber optic end turn vibration sensor #12. | |
| VIBT7 | - Turbine end fiber optic end turn vibration sensor #7. | |
| VIBT8 | - Turbine end fiber optic end turn vibration sensor #8. | |
| VIBT9 | - Turbine end fiber optic end turn vibration sensor #9. | |

Sensor Data

| Name | Normal | Fail LO | Fail HI | Predict Alarm | Diag Alarm | Warning Alarm | Trip Alarm |
|---|---|---|---|---|---|---|---|
| MGBA | 0.00 | 0.00 | 0.00 | 0.00 | 0.00 | 0.00 | 0.00 |
| MWXD | 100.00 | 100.00 | 100.00 | 100.00 | 100.00 | 100.00 | 100.00 |
| VIBE1 | 5.00 | 0.00 | 31.00 | 10.00 | 15.00 | 16.00 | 20.00 |
| VIBE2 | 5.00 | 0.00 | 31.00 | 10.00 | 15.00 | 16.00 | 20.00 |
| VIBE3 | 5.00 | 0.00 | 31.00 | 10.00 | 15.00 | 16.00 | 20.00 |
| VIBE4 | 5.00 | 0.00 | 31.00 | 10.00 | 15.00 | 16.00 | 20.00 |
| VIBE5 | 5.00 | 0.00 | 31.00 | 10.00 | 15.00 | 16.00 | 20.00 |
| VIBE6 | 5.00 | 0.00 | 31.00 | 10.00 | 15.00 | 16.00 | 20.00 |
| VIBT10 | 5.00 | 0.00 | 31.00 | 10.00 | 15.00 | 16.00 | 20.00 |
| VIBT11 | 5.00 | 0.00 | 31.00 | 10.00 | 15.00 | 16.00 | 20.00 |
| VIBT12 | 5.00 | 0.00 | 31.00 | 10.00 | 15.00 | 16.00 | 20.00 |
| VIBT7 | 5.00 | 0.00 | 31.00 | 10.00 | 15.00 | 16.00 | 20.00 |
| VIBT8 | 5.00 | 0.00 | 31.00 | 10.00 | 15.00 | 16.00 | 20.00 |
| VIBT9 | 5.00 | 0.00 | 31.00 | 10.00 | 15.00 | 16.00 | 20.00 |

Malfunctions

| | |
|---|---|
| m900 | - End turn vibration high on sensor #2 exciter end. |
| m901 | - End turn vibration high on sensor #10 turbine end. |
| m902 | - End turn vibration high on sensor #5 exciter end. |
| m903 | - End turn vibration high on sensor #7 turbine end. |
| m904 | - End turn vibration high on sensor #4 exciter end. |
| m905 | - End turn vibration high on sensor #8 turbine end. |
| m906 | - End turn vibration high on sensor #1 exciter end. |
| m907 | - End turn vibration high on sensor #11 turbine end. |
| m908 | - End turn vibration high on sensor #3 exciter end. |
| m909 | - End turn vibration high on sensor #9 turbine end. |
| m910 | - End turn vibration high on sensor #6 exciter end. |
| m911 | - End turn vibration high on sensor #12 turbine end. |
| m912 | - Vibration high on phase A end turns on exciter end. |
| m913 | - Phase A end turn vibration high at 2 o'clock. |
| m914 | - Phase A end turn vibration high at 8 o'clock. |
| m915 | - Vibration high on phase A end turns on turbine end. |
| m916 | - End turn vibration problem exists on phase A. |
| m917 | - Vibration high on phase B end turns on exciter end. |
| m918 | - Phase B end turn vibration high at 6 o'clock. |
| m919 | - Phase B end turn vibration high at 12 o'clock. |
| m920 | - Vibration high on phase B end turns on turbine end. |
| m921 | - End turn vibration problem exists on phase B. |
| m922 | - Vibration high on phase C end turns on exciter end. |
| m923 | - Phase C end turn vibration high at 4 o'clock. |
| m924 | - Phase C end turn vibration high at 10 o'clock. |
| m925 | - Vibration high on phase C end turns on turbine end. |

| | |
|---|---|
| m926 | - End turn vibration problem exists on phase C. |
| m927 | - End turn vibration has increased more than 3 mils over 6 hrs on sensor # |
| m927-1 | - End turn vibration has increased more than 3 mils over 6 hrs on sensor #1. 1 |
| m927-10 | - End turn vibration has increased more than 3 mils over 6 hrs on sensor #10. 10 |
| m927-11 | - End turn vibration has increased more than 3 mils over 6 hrs on sensor #11. 11 |
| m927-12 | - End turn vibration has increased more than 3 mils over 6 hrs on sensor #12. 12 |
| m927-2 | - End turn vibration has increased more than 3 mils over 6 hrs on sensor #2. 2 |
| m927-3 | - End turn vibration has increased more than 3 mils over 6 hrs on sensor #3. 3 |
| m927-4 | - End turn vibration has increased more than 3 mils over 6 hrs on sensor #4. 4 |
| m927-5 | - End turn vibration has increased more than 3 mils over 6 hrs on sensor #5. 5 |
| m927-6 | - End turn vibration has increased more than 3 mils over 6 hrs on sensor #6. 6 |
| m927-7 | - End turn vibration has increased more than 3 mils over 6 hrs on sensor #7. 7 |
| m927-8 | - End turn vibration has increased more than 3 mils over 6 hrs on sensor #8. 8 |
| m927-9 | - End turn vibration has increased more than 3 mils over 6 hrs on sensor #9. 9 |
| m928 | - End turn vibration has increased more than 2 mils over 6 hrs on sensor # |
| m928-1 | - End turn vibration has increased more than 2 mils over 6 hrs on sensor #1. 1 |
| m928-10 | - End turn vibration has increased more than 2 mils over 6 hrs on sensor #10. 10 |
| m928-11 | - End turn vibration has increased more than 2 mils over 6 hrs on sensor #11. 11 |
| m928-12 | - End turn vibration has increased more than 2 mils over 6 hrs on sensor #12. 12 |
| m928-2 | - End turn vibration has increased more than 2 mils over 6 hrs on sensor #2. 2 |
| m928-3 | - End turn vibration has increased more than 2 mils over 6 hrs on sensor #3. 3 |
| m928-4 | - End turn vibration has increased more than 2 mils over 6 hrs on sensor #4. 4 |
| m928-5 | - End turn vibration has increased more than 2 mils over 6 hrs on sensor #5. 5 |
| m928-6 | - End turn vibration has increased more than 2 mils over 6 hrs on sensor #6. 6 |
| m928-7 | - End turn vibration has increased more than 2 mils over 6 hrs on sensor #7. 7 |
| m928-8 | - End turn vibration has increased more than 2 mils over 6 hrs on sensor #8. 8 |
| m928-9 | - End turn vibration has increased more than 2 mils over 6 hrs on sensor #9. 9 |
| m929 | - End turn vibration has increased more than 1 mil over 6 hrs on sensor # |
| m929-1 | - End turn vibration has increased more than 1 mil over 6 hrs on sensor #1. 1 |
| m929-10 | - End turn vibration has increased more than 1 mil over 6 hrs on sensor #10. 10 |

| | |
|---|---|
| m929-11 | – End turn vibration has increased more than 1 mil over 6 hrs on sensor #11. 11 |
| m929-12 | – End turn vibration has increased more than 1 mil over 6 hrs on sensor #12. 12 |
| m929-2 | – End turn vibration has increased more than 1 mil over 6 hrs on sensor #2. 2 |
| m929-3 | – End turn vibration has increased more than 1 mil over 6 hrs on sensor #3. 3 |
| m929-4 | – End turn vibration has increased more than 1 mil over 6 hrs on sensor #4. 4 |
| m929-5 | – End turn vibration has increased more than 1 mil over 6 hrs on sensor #5. 5 |
| m929-6 | – End turn vibration has increased more than 1 mil over 6 hrs on sensor #6. 6 |
| m929-7 | – End turn vibration has increased more than 1 mil over 6 hrs on sensor #7. 7 |
| m929-8 | – End turn vibration has increased more than 1 mil over 6 hrs on sensor #8. 8 |
| m929-9 | – End turn vibration has increased more than 1 mil over 6 hrs on sensor #9. 9 |
| m930 | – Sensor VIBE1 is defective. |
| m930-1 | – Sensor VIBE1 is defective. 1 |
| m930-10 | – Sensor VIBT10 is defective. 10 |
| m930-11 | – Sensor VIBT11 is defective. 11 |
| m930-12 | – Sensor VIBT12 is defective. 12 |
| m930-2 | – Sensor VIBE2 is defective. 2 |
| m930-3 | – Sensor VIBE3 is defective. 3 |
| m930-4 | – Sensor VIBE4 is defective. 4 |
| m930-5 | – Sensor VIBE5 is defective. 5 |
| m930-6 | – Sensor VIBE6 is defective. 6 |
| m930-7 | – Sensor VIBT7 is defective. 7 |
| m930-8 | – Sensor VIBT8 is defective. 8 |
| m930-9 | – Sensor VIBT9 is defective. 9 |
| m931 | – Average vibration more than 1.5 mils above baseline. |
| m932 | – Average vibration more than 3 mils above baseline. |
| m933 | – Average vibration more than 5 mils above baseline. |
| m934 | – End turn vibration diagnostic alarm level exceeded. |
| m935 | – End turn vibration warning alarm level exceeded. |
| m936 | – End turn vibration shutdown alarm level exceeded. |
| m937 | – End turn vibration diagnostic alarm level exceeded. |
| m938 | – End turn vibration warning alarm level exceeded. |
| m939 | – End turn vibration shutdown alarm level exceeded. |
| m940 | – End turn vibration diagnostic alarm level exceeded. |
| m941 | – End turn vibration warning alarm level exceeded. |
| m942 | – End turn vibration shutdown alarm level exceeded. |
| m943 | – Maximum end turn vibration is at 24 hr maximum. |

SECTION II. Test Plan

Rulebase directory: ps:[harper.pds.code.regress.vb1]
TEST 1. ( Normal )
Exception 1:   ! Updated
TEST 2. ( Trip )
Exception 1:   CF > 0.800000
Exception 2:   LTN   CF > 0.800000

SECTION III. Test Cases

Test 1: ( Normal )

| Name | CF | Sev | Imp | Pri |
|---|---|---|---|---|
| m943 | 1.00 | 0.00 | 0.0 | 0.0 |
| m928-9 | 0.00 | 0.00 | 0.0 | 0.0 |
| m929-5 | 0.00 | 0.00 | 0.0 | 0.0 |
| m928-8 | 0.00 | 0.00 | 0.0 | 0.0 |
| m928-7 | 0.00 | 0.00 | 0.0 | 0.0 |
| m928-6 | 0.00 | 0.00 | 0.0 | 0.0 |
| m928-5 | 0.00 | 0.00 | 0.0 | 0.0 |
| m928-4 | 0.00 | 0.00 | 0.0 | 0.0 |
| m928-3 | 0.00 | 0.00 | 0.0 | 0.0 |
| m928-2 | 0.00 | 0.00 | 0.0 | 0.0 |
| m928-12 | 0.00 | 0.00 | 0.0 | 0.0 |
| m928-11 | 0.00 | 0.00 | 0.0 | 0.0 |
| m928-10 | 0.00 | 0.00 | 0.0 | 0.0 |
| m928-1 | 0.00 | 0.00 | 0.0 | 0.0 |
| m929-4 | 0.00 | 0.00 | 0.0 | 0.0 |
| m929-3 | 0.00 | 0.00 | 0.0 | 0.0 |
| m929-2 | 0.00 | 0.00 | 0.0 | 0.0 |
| m929-9 | 0.00 | 0.00 | 0.0 | 0.0 |
| m929-8 | 0.00 | 0.00 | 0.0 | 0.0 |
| m929-12 | 0.00 | 0.00 | 0.0 | 0.0 |
| m929-11 | 0.00 | 0.00 | 0.0 | 0.0 |
| m929-10 | 0.00 | 0.00 | 0.0 | 0.0 |
| m929-7 | 0.00 | 0.00 | 0.0 | 0.0 |
| m929-6 | 0.00 | 0.00 | 0.0 | 0.0 |
| m929-1 | 0.00 | 0.00 | 0.0 | 0.0 |
| m927-1 | 0.00 | 0.00 | 0.0 | 0.0 |
| m927-10 | 0.00 | 0.00 | 0.0 | 0.0 |
| m927-11 | 0.00 | 0.00 | 0.0 | 0.0 |
| m927-12 | 0.00 | 0.00 | 0.0 | 0.0 |
| m927-2 | 0.00 | 0.00 | 0.0 | 0.0 |
| m927-3 | 0.00 | 0.00 | 0.0 | 0.0 |
| m927-4 | 0.00 | 0.00 | 0.0 | 0.0 |
| m927-5 | 0.00 | 0.00 | 0.0 | 0.0 |
| m927-6 | 0.00 | 0.00 | 0.0 | 0.0 |
| m927-7 | 0.00 | 0.00 | 0.0 | 0.0 |
| m927-8 | 0.00 | 0.00 | 0.0 | 0.0 |
| m927-9 | 0.00 | 0.00 | 0.0 | 0.0 |
| m930-1 | -0.05 | 0.00 | 0.0 | 0.0 |
| m930-9 | -0.05 | 0.00 | 0.0 | 0.0 |
| m930-10 | -0.05 | 0.00 | 0.0 | 0.0 |
| m930-11 | -0.05 | 0.00 | 0.0 | 0.0 |
| m930-12 | -0.05 | 0.00 | 0.0 | 0.0 |
| m930-2 | -0.05 | 0.00 | 0.0 | 0.0 |
| m930-3 | -0.05 | 0.00 | 0.0 | 0.0 |
| m930-4 | -0.05 | 0.00 | 0.0 | 0.0 |
| m930-5 | -0.05 | 0.00 | 0.0 | 0.0 |
| m930-6 | -0.05 | 0.00 | 0.0 | 0.0 |
| m930-7 | -0.05 | 0.00 | 0.0 | 0.0 |
| m930-8 | -0.05 | 0.00 | 0.0 | 0.0 |
| m926 | -0.15 | 0.00 | 0.0 | 0.0 |
| m925 | -0.15 | 0.00 | 0.0 | 0.0 |
| m922 | -0.15 | 0.00 | 0.0 | 0.0 |
| m921 | -0.15 | 0.00 | 0.0 | 0.0 |

| Name | CF | Sev | Imp | Pri |
|---|---|---|---|---|
| m920 | -0.15 | 0.00 | 0.0 | 0.0 |
| m917 | -0.15 | 0.00 | 0.0 | 0.0 |
| m916 | -0.15 | 0.00 | 0.0 | 0.0 |
| m915 | -0.15 | 0.00 | 0.0 | 0.0 |
| m912 | -0.15 | 0.00 | 0.0 | 0.0 |
| m924 | -0.50 | 0.00 | 0.0 | 0.0 |
| m923 | -0.50 | 0.00 | 0.0 | 0.0 |
| m919 | -0.50 | 0.00 | 0.0 | 0.0 |
| m918 | -0.50 | 0.00 | 0.0 | 0.0 |
| m914 | -0.50 | 0.00 | 0.0 | 0.0 |
| m913 | -0.50 | 0.00 | 0.0 | 0.0 |
| m911 | -1.00 | 0.00 | 0.0 | 0.0 |
| m910 | -1.00 | 0.00 | 0.0 | 0.0 |
| m909 | -1.00 | 0.00 | 0.0 | 0.0 |
| m908 | -1.00 | 0.00 | 0.0 | 0.0 |
| m907 | -1.00 | 0.00 | 0.0 | 0.0 |
| m906 | -1.00 | 0.00 | 0.0 | 0.0 |
| m905 | -1.00 | 0.00 | 0.0 | 0.0 |
| m904 | -1.00 | 0.00 | 0.0 | 0.0 |
| m903 | -1.00 | 0.00 | 0.0 | 0.0 |
| m902 | -1.00 | 0.00 | 0.0 | 0.0 |
| m901 | -1.00 | 0.00 | 0.0 | 0.0 |
| m931 | -1.00 | 0.00 | 0.0 | 0.0 |
| m932 | -1.00 | 0.00 | 0.0 | 0.0 |
| m933 | -1.00 | 0.00 | 0.0 | 0.0 |
| m934 | -1.00 | 0.00 | 0.0 | 0.0 |
| m935 | -1.00 | 0.00 | 0.0 | 0.0 |
| m936 | -1.00 | 0.00 | 0.0 | 0.0 |
| m937 | -1.00 | 0.00 | 0.0 | 0.0 |
| m938 | -1.00 | 0.00 | 0.0 | 0.0 |
| m939 | -1.00 | 0.00 | 0.0 | 0.0 |
| m940 | -1.00 | 0.00 | 0.0 | 0.0 |
| m941 | -1.00 | 0.00 | 0.0 | 0.0 |
| m942 | -1.00 | 0.00 | 0.0 | 0.0 |
| m900 | -1.00 | 0.00 | 0.0 | 0.0 |

Test 2: ( Trip )
VIBE1

| Name | CF | Sev | Imp | Pri |
|---|---|---|---|---|
| m943 | 1.00 | 0.00 | 0.0 | 0.0 |
| m938 | 1.00 | 0.00 | 0.0 | 0.0 |
| m931 | 1.00 | 0.00 | 0.0 | 0.0 |
| m906 | 0.90 | 0.00 | 0.0 | 0.0 |
| m919 | 0.45 | 0.00 | 0.0 | 0.0 |
| m928-1 | 0.00 | 0.00 | 0.0 | 0.0 |
| m929-1 | 0.00 | 0.00 | 0.0 | 0.0 |
| m927-1 | 0.00 | 0.00 | 0.0 | 0.0 |
| m937 | 0.00 | 0.00 | 0.0 | 0.0 |
| m930-1 | -0.05 | 0.00 | 0.0 | 0.0 |
| m917 | -0.15 | 0.00 | 0.0 | 0.0 |
| m921 | -0.15 | 0.00 | 0.0 | 0.0 |
| m932 | -1.00 | 0.00 | 0.0 | 0.0 |
| m933 | -1.00 | 0.00 | 0.0 | 0.0 |
| m939 | -1.00 | 0.00 | 0.0 | 0.0 |

VIBE2

| Name | CF | Sev | Imp | Pri |
|---|---|---|---|---|
| m943 | 1.00 | 0.00 | 0.0 | 0.0 |
| m935 | 1.00 | 0.00 | 0.0 | 0.0 |
| m931 | 1.00 | 0.00 | 0.0 | 0.0 |
| m900 | 0.90 | 0.00 | 0.0 | 0.0 |
| m913 | 0.45 | 0.00 | 0.0 | 0.0 |
| m928-2 | 0.00 | 0.00 | 0.0 | 0.0 |
| m929-2 | 0.00 | 0.00 | 0.0 | 0.0 |
| m927-2 | 0.00 | 0.00 | 0.0 | 0.0 |
| m934 | 0.00 | 0.00 | 0.0 | 0.0 |
| m930-2 | -0.05 | 0.00 | 0.0 | 0.0 |
| m916 | -0.15 | 0.00 | 0.0 | 0.0 |
| m912 | -0.15 | 0.00 | 0.0 | 0.0 |
| m932 | -1.00 | 0.00 | 0.0 | 0.0 |
| m933 | -1.00 | 0.00 | 0.0 | 0.0 |
| m936 | -1.00 | 0.00 | 0.0 | 0.0 |

VIBE3

| Name | CF | Sev | Imp | Pri |
|---|---|---|---|---|
| m943 | 1.00 | 0.00 | 0.0 | 0.0 |
| m941 | 1.00 | 0.00 | 0.0 | 0.0 |
| m931 | 1.00 | 0.00 | 0.0 | 0.0 |
| m908 | 0.90 | 0.00 | 0.0 | 0.0 |
| m923 | 0.45 | 0.00 | 0.0 | 0.0 |
| m928-3 | 0.00 | 0.00 | 0.0 | 0.0 |
| m929-3 | 0.00 | 0.00 | 0.0 | 0.0 |
| m927-3 | 0.00 | 0.00 | 0.0 | 0.0 |
| m940 | 0.00 | 0.00 | 0.0 | 0.0 |
| m930-3 | -0.05 | 0.00 | 0.0 | 0.0 |
| m926 | -0.15 | 0.00 | 0.0 | 0.0 |
| m922 | -0.15 | 0.00 | 0.0 | 0.0 |
| m932 | -1.00 | 0.00 | 0.0 | 0.0 |
| m933 | -1.00 | 0.00 | 0.0 | 0.0 |
| m942 | -1.00 | 0.00 | 0.0 | 0.0 |

VIBE4

| Name | CF | Sev | Imp | Pri |
|---|---|---|---|---|
| m943 | 1.00 | 0.00 | 0.0 | 0.0 |
| m938 | 1.00 | 0.00 | 0.0 | 0.0 |
| m931 | 1.00 | 0.00 | 0.0 | 0.0 |
| m904 | 0.90 | 0.00 | 0.0 | 0.0 |
| m918 | 0.45 | 0.00 | 0.0 | 0.0 |
| m928-4 | 0.00 | 0.00 | 0.0 | 0.0 |
| m929-4 | 0.00 | 0.00 | 0.0 | 0.0 |
| m927-4 | 0.00 | 0.00 | 0.0 | 0.0 |
| m937 | 0.00 | 0.00 | 0.0 | 0.0 |
| m930-4 | -0.05 | 0.00 | 0.0 | 0.0 |
| m917 | -0.15 | 0.00 | 0.0 | 0.0 |
| m921 | -0.15 | 0.00 | 0.0 | 0.0 |
| m932 | -1.00 | 0.00 | 0.0 | 0.0 |
| m933 | -1.00 | 0.00 | 0.0 | 0.0 |
| m939 | -1.00 | 0.00 | 0.0 | 0.0 |

VIBE5

| Name | CF | Sev | Imp | Pri |
|---|---|---|---|---|
| m943 | 1.00 | 0.00 | 0.0 | 0.0 |
| m935 | 1.00 | 0.00 | 0.0 | 0.0 |
| m931 | 1.00 | 0.00 | 0.0 | 0.0 |
| m902 | 0.90 | 0.00 | 0.0 | 0.0 |
| m914 | 0.45 | 0.00 | 0.0 | 0.0 |
| m928-5 | 0.00 | 0.00 | 0.0 | 0.0 |
| m927-5 | 0.00 | 0.00 | 0.0 | 0.0 |
| m929-5 | 0.00 | 0.00 | 0.0 | 0.0 |
| m934 | 0.00 | 0.00 | 0.0 | 0.0 |
| m930-5 | -0.05 | 0.00 | 0.0 | 0.0 |
| m916 | -0.15 | 0.00 | 0.0 | 0.0 |
| m912 | -0.15 | 0.00 | 0.0 | 0.0 |
| m932 | -1.00 | 0.00 | 0.0 | 0.0 |
| m933 | -1.00 | 0.00 | 0.0 | 0.0 |
| m936 | -1.00 | 0.00 | 0.0 | 0.0 |

VIBE6

| Name | CF | Sev | Imp | Pri |
|---|---|---|---|---|
| m943 | 1.00 | 0.00 | 0.0 | 0.0 |
| m941 | 1.00 | 0.00 | 0.0 | 0.0 |
| m931 | 1.00 | 0.00 | 0.0 | 0.0 |
| m910 | 0.90 | 0.00 | 0.0 | 0.0 |
| m924 | 0.45 | 0.00 | 0.0 | 0.0 |
| m928-6 | 0.00 | 0.00 | 0.0 | 0.0 |
| m929-6 | 0.00 | 0.00 | 0.0 | 0.0 |
| m927-6 | 0.00 | 0.00 | 0.0 | 0.0 |
| m940 | 0.00 | 0.00 | 0.0 | 0.0 |
| m930-6 | -0.05 | 0.00 | 0.0 | 0.0 |
| m926 | -0.15 | 0.00 | 0.0 | 0.0 |
| m922 | -0.15 | 0.00 | 0.0 | 0.0 |
| m932 | -1.00 | 0.00 | 0.0 | 0.0 |
| m933 | -1.00 | 0.00 | 0.0 | 0.0 |
| m942 | -1.00 | 0.00 | 0.0 | 0.0 |

VIBT10

| Name | CF | Sev | Imp | Pri |
|---|---|---|---|---|
| m943 | 1.00 | 0.00 | 0.0 | 0.0 |
| m935 | 1.00 | 0.00 | 0.0 | 0.0 |
| m931 | 1.00 | 0.00 | 0.0 | 0.0 |
| m901 | 0.90 | 0.00 | 0.0 | 0.0 |
| m913 | 0.45 | 0.00 | 0.0 | 0.0 |
| m928-10 | 0.00 | 0.00 | 0.0 | 0.0 |
| m929-10 | 0.00 | 0.00 | 0.0 | 0.0 |
| m927-10 | 0.00 | 0.00 | 0.0 | 0.0 |
| m934 | 0.00 | 0.00 | 0.0 | 0.0 |
| m930-10 | -0.05 | 0.00 | 0.0 | 0.0 |
| m916 | -0.15 | 0.00 | 0.0 | 0.0 |
| m915 | -0.15 | 0.00 | 0.0 | 0.0 |
| m932 | -1.00 | 0.00 | 0.0 | 0.0 |
| m933 | -1.00 | 0.00 | 0.0 | 0.0 |
| m936 | -1.00 | 0.00 | 0.0 | 0.0 |

VIBT11

| Name | CF | Sev | Imp | Pri |
|---|---|---|---|---|
| m943 | 1.00 | 0.00 | 0.0 | 0.0 |
| m938 | 1.00 | 0.00 | 0.0 | 0.0 |
| m931 | 1.00 | 0.00 | 0.0 | 0.0 |
| m907 | 0.90 | 0.00 | 0.0 | 0.0 |
| m919 | 0.45 | 0.00 | 0.0 | 0.0 |
| m928-11 | 0.00 | 0.00 | 0.0 | 0.0 |
| m929-11 | 0.00 | 0.00 | 0.0 | 0.0 |
| m927-11 | 0.00 | 0.00 | 0.0 | 0.0 |
| m937 | 0.00 | 0.00 | 0.0 | 0.0 |
| m930-11 | -0.05 | 0.00 | 0.0 | 0.0 |
| m920 | -0.15 | 0.00 | 0.0 | 0.0 |
| m921 | -0.15 | 0.00 | 0.0 | 0.0 |
| m932 | -1.00 | 0.00 | 0.0 | 0.0 |
| m933 | -1.00 | 0.00 | 0.0 | 0.0 |
| m939 | -1.00 | 0.00 | 0.0 | 0.0 |

VIBT12

| Name | CF | Sev | Imp | Pri |
|---|---|---|---|---|
| m943 | 1.00 | 0.00 | 0.0 | 0.0 |
| m941 | 1.00 | 0.00 | 0.0 | 0.0 |
| m931 | 1.00 | 0.00 | 0.0 | 0.0 |
| m911 | 0.90 | 0.00 | 0.0 | 0.0 |
| m924 | 0.45 | 0.00 | 0.0 | 0.0 |
| m928-12 | 0.00 | 0.00 | 0.0 | 0.0 |
| m929-12 | 0.00 | 0.00 | 0.0 | 0.0 |
| m927-12 | 0.00 | 0.00 | 0.0 | 0.0 |
| m940 | 0.00 | 0.00 | 0.0 | 0.0 |
| m930-12 | -0.05 | 0.00 | 0.0 | 0.0 |
| m926 | -0.15 | 0.00 | 0.0 | 0.0 |
| m925 | -0.15 | 0.00 | 0.0 | 0.0 |
| m932 | -1.00 | 0.00 | 0.0 | 0.0 |
| m933 | -1.00 | 0.00 | 0.0 | 0.0 |
| m942 | -1.00 | 0.00 | 0.0 | 0.0 |

VIBT7

| Name | CF | Sev | Imp | Pri |
|---|---|---|---|---|
| m943 | 1.00 | 0.00 | 0.0 | 0.0 |
| m935 | 1.00 | 0.00 | 0.0 | 0.0 |
| m931 | 1.00 | 0.00 | 0.0 | 0.0 |
| m903 | 0.90 | 0.00 | 0.0 | 0.0 |
| m914 | 0.45 | 0.00 | 0.0 | 0.0 |
| m929-7 | 0.00 | 0.00 | 0.0 | 0.0 |
| m927-7 | 0.00 | 0.00 | 0.0 | 0.0 |
| m928-7 | 0.00 | 0.00 | 0.0 | 0.0 |
| m934 | 0.00 | 0.00 | 0.0 | 0.0 |
| m930-7 | -0.05 | 0.00 | 0.0 | 0.0 |
| m916 | -0.15 | 0.00 | 0.0 | 0.0 |
| m915 | -0.15 | 0.00 | 0.0 | 0.0 |
| m932 | -1.00 | 0.00 | 0.0 | 0.0 |
| m933 | -1.00 | 0.00 | 0.0 | 0.0 |
| m936 | -1.00 | 0.00 | 0.0 | 0.0 |

VIBT8

| Name | CF | Sev | Imp | Pri |
|---|---|---|---|---|
| m943 | 1.00 | 0.00 | 0.0 | 0.0 |
| m938 | 1.00 | 0.00 | 0.0 | 0.0 |
| m931 | 1.00 | 0.00 | 0.0 | 0.0 |
| m905 | 0.90 | 0.00 | 0.0 | 0.0 |
| m918 | 0.45 | 0.00 | 0.0 | 0.0 |
| m929-8 | 0.00 | 0.00 | 0.0 | 0.0 |
| m927-8 | 0.00 | 0.00 | 0.0 | 0.0 |
| m928-8 | 0.00 | 0.00 | 0.0 | 0.0 |
| m937 | 0.00 | 0.00 | 0.0 | 0.0 |
| m930-8 | -0.05 | 0.00 | 0.0 | 0.0 |
| m920 | -0.15 | 0.00 | 0.0 | 0.0 |
| m921 | -0.15 | 0.00 | 0.0 | 0.0 |
| m932 | -1.00 | 0.00 | 0.0 | 0.0 |
| m933 | -1.00 | 0.00 | 0.0 | 0.0 |
| m939 | -1.00 | 0.00 | 0.0 | 0.0 |

VIBT9

| Name | CF | Sev | Imp | Pri |
|---|---|---|---|---|
| m943 | 1.00 | 0.00 | 0.0 | 0.0 |
| m941 | 1.00 | 0.00 | 0.0 | 0.0 |
| m931 | 1.00 | 0.00 | 0.0 | 0.0 |
| m909 | 0.90 | 0.00 | 0.0 | 0.0 |
| m923 | 0.45 | 0.00 | 0.0 | 0.0 |
| m929-9 | 0.00 | 0.00 | 0.0 | 0.0 |
| m927-9 | 0.00 | 0.00 | 0.0 | 0.0 |
| m928-9 | 0.00 | 0.00 | 0.0 | 0.0 |
| m940 | 0.00 | 0.00 | 0.0 | 0.0 |
| m930-9 | -0.05 | 0.00 | 0.0 | 0.0 |
| m926 | -0.15 | 0.00 | 0.0 | 0.0 |
| m925 | -0.15 | 0.00 | 0.0 | 0.0 |
| m932 | -1.00 | 0.00 | 0.0 | 0.0 |
| m933 | -1.00 | 0.00 | 0.0 | 0.0 |
| m942 | -1.00 | 0.00 | 0.0 | 0.0 |

Appendix III

```
KNOWLEDGE-BASE = 1(schema)
TIMESETS = normal-data + fail_LO-data + fail_HI-data +
           predict-data + diagnostic-data + warning-data + trip-data
active-malfs = TO-BE-DEFINED
belief-rule = TO-BE-DEFINED
context = TO-BE-DEFINED
copyright = TO-BE-DEFINED       * Westinghouse *
data-timestamp = TO-BE-DEFINED   * date and time *
error-message = TEXT
event-record = TEXT
exception = test-name + 1(sensor-name + sensor-value)6 +
            (simple-exception | set-exception)
exception-header = copyright + timestamp
exception-output = exception-header + 1(exception)
history-list = TEXT
info-message = TEXT
log-entry = test-name + 1(sensor-name + sensor-value)6 + active-malfs
log-header = copyright + timestamp
log-output = log-header + 1(sensor-descrip) + 1(sensor-value) +
             1(malf-descrip) + test-plan + log-entry
malf-descrip = schema-descrip
message = timestamp + (info-message | error-message)
node = TO-BE-DEFINED
node-history = 1(node-name + history-list) + 1(node-name + event-record)
```

```
node-name = schema-name
non-rules = 1{node} + 1{context} + other-nodes
options = TO-BE-DEFINED
other-attributes = TO-BE-DEFINED
other-nodes = TO-BE-DEFINED
other-unit-info = TO-BE-DEFINED
paralt-rule = TO-BE-DEFINED
plan = production-directory + options + 1{test}
production-directory = TO-BE-DEFINED
reading-transform = TO-BE-DEFINED
rules = 1{belief-rule} + 1{paralt-rule} + 1{reading-transform}
schema = TO-BE-DEFINED           * memory-resident data structure *
schema-attributes = schema-name + schema-type + schema-descrip +
                    other-attributes
schema-descrip = schema-name + schema-description
schema-description = TEXT
schema-name = TEXT
schema-type = TO-BE-DEFINED
schema-update = TO-BE-DEFINED
sensor-data = TEXT
sensor-descrip = schema-descrip
sensor-name = TO-BE-DEFINED
sensor-value = sensor-name + reading-value + data-timestamp
set-exception = TO-BE-DEFINED
simple-exception = TO-BE-DEFINED
standard-contexts = TO-BE-DEFINED
standard-schemata = standard-contexts + time-sensors
test = {test-name}6
test-name = TO-BE-DEFINED
test-plan = plan
time-sensors = TO-BE-DEFINED
timestamp = TO-BE-DEFINED
unit-info = unit-name + other-unit-info
unit-name = TO-BE-DEFINED
user-defined-schemata = non-rules + rules
TEXT = TO-BE-DEFINED
diagnostic-data = TO-BE-DEFINED
fail_HI-data = TO-BE-DEFINED
fail_LO-data = TO-BE-DEFINED BEGIN Run a diagnosis with the perturbed values Un-update all the sensors.
  Clear all the malfunction updated-last-cycle flags.

Set and update sensor I to its value in the first data set of this test.
  Un-fire all rules supported by this sensor.

IF the test order is greater than 1 THEN
     Set and update sensor J to its value in the second data set of this test.
     Un-fire all rules supported by this sensor.
  END IF IF the test order is greater than 2 THEN
     Set and update sensor K to its value in the third data set of this test.
     Un-fire all rules supported by this sensor.
  END IF IF the test order is greater than 3 THEN
     Set and update sensor L to its value in the fourth data set of this test.
     Un-fire all rules supported by this sensor.
  END IF IF the test order is greater than 4 THEN
     Set and update sensor M to its value in the fifth data set of this test.
     Un-fire all rules supported by this sensor.
  END IF
```

```
IF the test order is greater than 5 THEN
    Set and update sensor M to its value in the sixth data set of this test.
    Un-fire all rules supported by this sensor.
END IF WRITE the perturbed data changes banner to the log file
Run the inference engine.

END Run the diagnosis with the perturbed values

BEGIN Check, test, and report any exceptions

REPEAT for each exception in the test

REPEAT with I = first to last malfunction

IF this malfunction was not updated during the last diagnosis THEN
                NEXT REPEAT
            END IF IF the exception operator is not UPDATED and not NOT_UPDATED THEN
                IF the exception attribute is CF THEN
                    SET the parameter to the malfunction confidence factor.
                ELSE IF the exception attribute is SEVERITY THEN
                    SET the parameter to the malfunction severity.
                ELSE IF the exception attribute is IMPORTANCE THEN
                    SET the parameter to the malfunction importance.
                ELSE IF the exception attribute is IMPORTANCE THEN
                    SET the parameter to the product of the malfunction
                        confidence, severity, and importance.
                END IF
            END IF IF this is a change exception THEN
                Normalize the parameter to the normal results.
            IF this is a set exception THEN
                IF the exception qualifier is ALL THEN
                    IF the exception operator is NOT_UPDATED THEN
                        Include this malfunction in the set.
                    ELSE IF the exception operator is EQUAL AND
                            the parameter is not equal to the exception trigger THEN
                        Include this malfunction in the set.
                    ELSE IF the exception operator is NOT_EQUAL AND
                            the parameter is equal to the exception trigger THEN
                        Include this malfunction in the set.
                    ELSE IF the exception operator is GREATER AND
                            the parameter is less than or equal to
                            the exception trigger THEN
                        Include this malfunction in the set.
                    ELSE IF the exception operator is GREATER_EQUAL AND
                            the parameter is less than to
                            the exception trigger THEN
                        Include this malfunction in the set.
                    ELSE IF the exception operator is LESS AND
                            the parameter is greater than or equal to
                            the exception trigger THEN
                        Include this malfunction in the set.
```

```
       ELSE IF the exception operator is LESS_EQUAL AND
                the parameter is greater than the exception trigger THEN
          Include this malfunction in the set.
       END IF ELSE IF the exception qualifier is
              SOME OR NO OR LTN OR GTN THEN
       IF the exception operator is UPDATED THEN
          Include this malfunction in the set.
       ELSE IF the exception operator is EQUAL AND
                the parameter is equal to the exception trigger THEN
          Include this malfunction in the set.
       ELSE IF the exception operator is NOT_EQUAL AND
                the parameter is not equal to the exception trigger THEN
          Include this malfunction in the set.
       ELSE IF the exception operator is GREATER AND
                the parameter is greater than to the exception trigger THEN
          Include this malfunction in the set.
       ELSE IF the exception operator is GREATER_EQUAL AND
                the parameter is greater than or equal to
                the exception trigger THEN
          Include this malfunction in the set.
       ELSE IF the exception operator is LESS AND
                the parameter is less than to the exception trigger THEN
          Include this malfunction in the set.
       ELSE IF the exception operator is LESS_EQUAL AND
                the parameter is less than or equal to
                the exception trigger THEN
          Include this malfunction in the set.
       END IF
    END IF ELSE this is not a set exception
    IF the exception operator is UPDATED THEN
       WRITE this malfunction as an UPDATED exception report.
    ELSE IF the exception operator is EQUAL AND
             the parameter is equal to the exception trigger THEN
       WRITE this malfunction as an EQUAL exception report.
    ELSE IF the exception operator is NOT_EQUAL AND
             the parameter is not equal to the exception trigger THEN
       WRITE this malfunction as an NOT_EQUAL exception report.
    ELSE IF the exception operator is GREATER AND WRITE this malfunction as an GREATER exception report.
    ELSE IF the exception operator is GREATER_EQUAL AND
             the parameter is greater than or equal to
             the exception trigger THEN
       WRITE this malfunction as an GREATER_EQUAL exception report.
    ELSE IF the exception operator is LESS AND
             the parameter is less than the exception trigger THEN
       WRITE this malfunction as an LESS exception report.
    ELSE IF the exception operator is LESS_EQUAL AND
             the parameter is less than or equal to
             the exception trigger THEN
       WRITE this malfunction as an LESS_EQUAL exception report.
    END IF
 END IF
END REPEAT SET N equal to the number of members in the set.
```

```
IF this is a set exception THEN

IF the exception qualifier is ALL AND
      there are no members in the set THEN
      IF the exception operator is UPDATED THEN
         WRITE an ALL_HALFS_UPDATED exception report.
      ELSE IF the exception operator is NOT_UPDATED THEN
         WRITE an ALL_HALFS_NOT_UPDATED exception report.
      ELSE the exception operator is EQUAL, NOT_EQUAL,
           LESS, LESS_EQUAL, GREATER, or GREATER_EQUAL
         WRITE an ALL_HALFS_<exception operator> exception report.
      END IF ELSE IF the exception qualifier is SOME THEN
      IF the exception operator is UPDATED THEN
         WRITE an <N>_HALFS_UPDATED exception report.
      ELSE IF the exception operator is NOT_UPDATED THEN
         WRITE an <N>_HALFS_NOT_UPDATED exception report.
      ELSE the exception operator is EQUAL, NOT_EQUAL,
           LESS, LESS_EQUAL, GREATER, or GREATER_EQUAL
         WRITE an <N>_HALFS_<exception operator> exception report.
      END IF ELSE IF the exception qualifier is NO AND
      there are no members in the set THEN
      IF the exception operator is UPDATED THEN
         WRITE an NO_HALFS_UPDATED exception report.
      ELSE IF the exception operator is NOT_UPDATED THEN
         WRITE an NO_HALFS_NOT_UPDATED exception report.
      ELSE the exception operator is EQUAL, NOT_EQUAL,
           LESS, LESS_EQUAL, GREATER, or GREATER_EQUAL
         WRITE an NO_HALFS_<exception operator> exception report.
      END IF ELSE IF the exception qualifier is LTN AND
      the number of members in the set is less than the test order THEN
      IF the exception operator is UPDATED THEN
         WRITE an LTN_HALFS_UPDATED exception report.
      ELSE IF the exception operator is NOT_UPDATED THEN
         WRITE an LTN_HALFS_NOT_UPDATED exception report.
      ELSE the exception operator is EQUAL, NOT_EQUAL,
           LESS, LESS_EQUAL, GREATER, or GREATER_EQUAL
         WRITE an LTN_HALFS_<exception operator> exception report.
      END IF ELSE IF the exception qualifier is GTN AND
      the number of members in the set is greater than the test order THEN WRITE an GTN_HALFS_UPDATED exception report.
      ELSE IF the exception operator is NOT_UPDATED THEN
         WRITE an GTN_HALFS_NOT_UPDATED exception report.
      ELSE the exception operator is EQUAL, NOT_EQUAL,
           LESS, LESS_EQUAL, GREATER, or GREATER_EQUAL
         WRITE an GTN_HALFS_<exception operator> exception report.
      END IF END IF
  END IF
 END REPEAT
END Check, test, and report any exceptions
```

Appendix IV

```
BEGIN execute

REPEAT FOR each test in the test plan

WRITE the test banner to the log file.
    IF the test order is greater than 0 THEN
      REPEAT WITH I = first to last sensor
    ELSE REPEAT once
        IF the test order is greater than 1 THEN
          REPEAT WITH J = first to last sensor
        ELSE REPEAT once
            IF the test order is greater than 2 THEN
              REPEAT WITH K = first to last sensor
            ELSE REPEAT once
                IF the test order is greater than 3 THEN
                  REPEAT WITH L = first to last sensor
                ELSE REPEAT once
                    IF the test order is greater than 4 THEN
                      REPEAT WITH M = first to last sensor
                    ELSE REPEAT once
                        IF the test order is greater than 5 THEN
                          REPEAT WITH N = first to last sensor
                        ELSE REPEAT once WRITE the cycle header to the log file.
                            (Run a diagnosis with the normal values.)
                            IF the test order is greater than 0 THEN
                                (Run a diagnosis with the perturbed values.)
                            END IF
                            (Check, test, and report any exceptions.)
                            WRITE the performance metrics to the log file.
                            WRITE the results to the log file.

END REPEAT
                    END IF
                    END REPEAT
                END IF
                END REPEAT
            END IF
            END REPEAT
        END IF
        END REPEAT
    END IF
    END REPEAT
  END IF

END REPEAT

END execute
```

```
BEGIN Run a diagnosis with the normal values

Set and update all the sensors to their normal values.
   Un-fire all rules supported by updated sensors.
   Run the inference engine.
   IF the normal results have not been saved THEN
      Save the normal results.
   END IF END Run a diagnosis with the normal values normal-data   = TO-BE-DEFINED
predict-data  = TO-BE-DEFINED
trip-data     = TO-BE-DEFINED
warning-data  = TO-BE-DEFINED
reading-value = TO-BE-DEFINED
```

We claim:

1. A test system for testing an expert system having rules, said test system comprising:

test storage means for storing a complete normal test set, separate from the rules, for testing the rules and a complete specialized test set, separate from the rules, for testing the rules, the normal test set comprising data values inside a diagnostic level which will not cause the expert system to perform a diagnosis and the specialized test set comprising data values which will cause the expert system to perform the diagnosis; and testing means for testing all the expert system rules to automatically detect malfunctioning rules using the complete normal test set and the complete specialized test set to produce a complete output data set.

2. A system as recited in claim 1, wherein said testing means comprises exception means for comparing expert system outputs responsive to the specialized test set with an exception condition and reporting when coincidence exists.

3. A system as recited in claim 1, wherein said testing means performs testing responsive to a test plan designating a test set order, test type and exceptions.

4. A system as recited in claim 3, further comprising test language means for converting test plan input statements into the test plan.

5. A system as recite din claim 1, wherein said test means produces a log including test parameters, a test plan and a test case.

6. A system as recited in claim 1, wherein said testing means cyclically applies the normal test set to the expert system followed by applying, to the expert system, the normal test set with one value changed to a specialized test data value.

7. A system as recited in claim 1, wherein said testing means performs an nth order test where n is an integer.

8. A system as recited in claim 1, further comprising:

result storage means for storing results of tests before and after rule changes; and comparison means for comparing the results before and after the rule changes and indicating differences.

9. A test system for testing an expert system for a power plant, the expert system having rules and said test system comprising:

test storage means for storing an array of test sets for testing the rules, the test sets including a complete normal sensor value set, separate from the rules, and complete specialized sensor value sets separate from the rules and including sensor failure, predictive and diagnostic values, the normal sensor value set comprising data values inside a diagnostic level which will normally not cause the expert system to perform a diagnosis and the specialized sensor value sets comprising data values which will normally cause the expert system to perform the diagnosis;

testing means for testing all the expert system rules cyclically to automatically detect malfunctioning rules using the normal sensor value set and the specialized sensor value set while iteratively applying the specialized sensor value sets to produce a complete output data set, said testing means including:

reading means for reading a test input in a test plan language and converting the test inputs into a test plan, the test plan specifying an order of the test and exceptions to be tested;

exception means for comparing expert system outputs with the expected results and reporting when a match occurs;

logging means for logging sensors tested, sensor data, malfunctions indicated, malfunction descriptions, the test plan and the test cases comprising the specialized sensor value sets; and comparison means for comparing logs before and after changes to the expert system rules.

10. A method, initiated by a user, of testing an expert system having rules, comprising the steps of:

(a) applying, by the computer, a complete normal test set to the rules of the expert system, the normal test set being separate from the rules and comprising normal data values inside a diagnostic level which will normally not cause the expert system to perform a diagnosis and;

(b) applying, by the computer, a complete specialized test set to the rules of the expert system, the specialized test set being separate from the rules and comprising test data values which normally will cause the expert system to perform the diagnosis; and (c) recording, by the computer, abnormal rule executions produced during step (b).

11. A method of testing an expert system as recited in claim 10, wherein step (a) comprises steps of:

(a1) setting all input values to the normal data values; and
(a2) firing rules of the expert system;
wherein step (b) comprises the steps of:
(b1) setting one of the input values to one of the test data values; and
(b') firing the rules of the expert system;
wherein step (c) comprises the steps of:
(c1) comparing outputs of the expert system with exceptions; and
(c2) producing an exception indication when a match occurs; and
wherein said method comprises repeating steps (a1)-(c2) while iteratively selecting different ones of the input values in step (b1) to set to another one of the test data values.

12. A method as recited in claim 11, further comprising reading testing requirements input by a user and producing a test plan and wherein step (b) applies a test set responsive to the test plan.

13. A method as recited in claim 11, wherein step (b1) sets a pair of input values to a pair of test data values.

14. A method as recited in claim 11, further comprising:
(d) performing steps (a-c) with rulebase changes in the expert system; and
(e) comparing test outputs before and after the rulebase changes.

15. A method, initiated by a user, of testing an expert system for a power plant, comprising the steps of:

(a) reading, by the computer, test requirements input by a user specifying test type, test order and test exceptions;
(b) converting, by the computer, the test requirements into a test plan;
(c) initializing, by the computer, the expert system;
(d) setting, by the computer, all sensor input values to normal values test values being separate from the rules and comprising data values inside a diagnostic level which will normally not cause the expert system to perform a diagnosis;
(e) updating and firing rules of the expert system;
(f) setting, by the computer, sensor values to test values responsive to the test plan, the test values being separate from the rules and comprising data values which will normally cause the expert system to perform the diagnosis;
(g) updating and firing the rules of the expert system;
(h) logging, by the computer, all outputs of the expert system;
(i) comparing, by the computer, the outputs of the expert system to the test exceptions;
(j) producing, by the computer, an exception report when a match occurs;
(k) repeating steps (d)-(j) in accordance with the test plan for all test values;
(l) performing steps (a)-(k) after the user makes changes to the rules in the expert system; and
(m) comparing, by the computer, the logging outputs produced before and after the changes to the rules.

* * * * *